United States Patent [19]

Ishii et al.

[11] Patent Number: 5,503,815
[45] Date of Patent: Apr. 2, 1996

[54] METHOD FOR THE PREPARATION OF A LANTHANUM MANGANITE POWDER

[75] Inventors: Masatoshi Ishii; Masanobu Uchida; Akihiko Yoshida; Shigeru Sakai; Norifumi Yoshida, all of Fukui, Japan

[73] Assignee: Shin-Etsu Chemical Co., Ltd., Tokyo, Japan

[21] Appl. No.: 355,226

[22] Filed: Dec. 8, 1994

Related U.S. Application Data

[63] Continuation of Ser. No. 159,525, Dec. 1, 1993, abandoned.

[30] Foreign Application Priority Data

Dec. 2, 1992 [JP] Japan .................................. 4-349930

[51] Int. Cl.$^6$ .......................... C01F 17/00; C01G 45/12
[52] U.S. Cl. .......................................... 423/263; 423/599
[58] Field of Search ...................................... 423/263, 599

[56] References Cited

U.S. PATENT DOCUMENTS 4,335,088  6/1982  Efimov et al. .......................... 423/420
5,168,095  12/1992  Munakata et al. ....................... 423/599

FOREIGN PATENT DOCUMENTS 4-74721  3/1992  Japan .................................... 423/263

*Primary Examiner*—Steven Bos
*Attorney, Agent, or Firm*—Wenderoth, Lind & Ponack

[57] ABSTRACT

Proposed is a method for the preparation of a powder of lanthanum manganite having excellent flowability with an angle of repose not exceeding 45°. Different from conventional methods for the preparation of lanthanum manganite powder by the calcination of a powder blend of thermally decomposable compounds of lanthanum and manganese or by the precipitation of a composite carbonate of lanthanum and manganese with addition of an aqueous solution of ammonium carbonate to an aqueous solution of lanthanum and manganese compounds followed by calcination of the composite carbonate, the invention proposes to precipitate the composite carbonate by the addition of ammonium carbonate in a particulate form to the aqueous solution of lanthanum and manganese compounds followed by calcination of the composite carbonate.

3 Claims, No Drawings

METHOD FOR THE PREPARATION OF A LANTHANUM MANGANITE POWDER

This application is a continuation of now abandoned application Ser. No. 08/159,525, filed Dec. 1, 1993, now abandoned.

BACKGROUND OF THE INVENTION

The present invention relates to a method for the preparation of a lanthanum manganite powder which is useful as a material of various kinds of catalysts, electrodes and the like mainly in the form of a sintered body.

It is conventional that a powder of lanthanum manganite, which is sometimes partially substituted by strontium to have a composition formula of $(La_{1-x}Sr_x)_yMnO_z$, in which x is 0 or a positive number not exceeding 0.5, y is a positive number in the range from 0.8 to 1 and z is a positive number not exceeding 3, is prepared by blending powders of each of a specified and weighed amount of lanthanum oxide, manganese carbonate and, optionally, strontium carbonate by a dry process, wet process or a combination of both and calcining the powder blend at a temperature of 1200° C. or higher.

The above described conventional method for the preparation of a lanthanum manganite powder has problems in several respects. For example, it is almost unavoidable that a considerable portion of the starting powders remains unreacted in the product obtained by calcination and the amount of the unreacted starting materials can hardly be undetectably small even by conducting the process of calcination at a higher temperature for a longer length of time than usually undertaken. When a lanthanum manganite powder contains a substantial amount of unreacted lanthanum oxide, the sintered body prepared therefrom has a greatly decreased mechanical strength or the electric properties of the sintered body are very adversely affected. Disadvantages are also unavoidable by the high temperature calcination even when the lanthanum manganite powder is to be used in the form of a powder as such as in the applications for thermal spraying and the like because, even by setting aside the costs for the calcination at such a high temperature for a long time, growth of particles is unavoidable in the powder blend to give a semi-sintered mass of coarse particles which must be disintegrated and finely pulverized.

As a remedy for the above described disadvantages, Japanese Patent Kokai 4-74721 proposes a method for the preparation of a strontium-substituted lanthanum manganite powder in which an aqueous solution of water-soluble compounds of lanthanum, strontium and manganese in a specified proportion is admixed with an aqueous solution of ammonium carbonate to precipitate a composite carbonate and the precipitates are collected by filtration, dried and calcined to give a lanthanum manganite powder. A problem in the lanthanum manganite powder obtained by this method is that, although the amount of the unreacted starting materials in the thus produced powder can be small enough, the product powder is poor in respect of the flowability behavior so that the powder is not suitable for use, for example, in thermal spraying in which good flowability of the refractory powder is essential, for example, in order not to cause bridging of the powder in the feeder hopper.

SUMMARY OF THE INVENTION

The present invention accordingly has an object to provide a novel and improved method for the preparation of a powder of lanthanum manganite, optionally, substituted by strontium capable of giving a powder of lanthanum manganite exhibiting excellent flowability behavior in addition to the advantage of the outstandingly low content of the unreacted starting materials of lanthanum, manganese and, optionally, strontium.

Thus, the method of the present invention for the preparation of a powder of lanthanum manganite having a composition formula of $(La_{1-x}Sr_x)_yMnO_z$, in which x is 0 or a positive number not exceeding 0.5, y is a positive number in the range from 0.8 to 1 and z is a positive number in the range from 2.5 to 3.0, comprises the steps of:

(a) preparing an aqueous solution of water-soluble compounds of lanthanum, manganese and, optionally, strontium by dissolving the compounds in water or by dissolving compounds of lanthanum, manganese and, optionally, strontium in an inorganic acid;

(b) adjusting the pH of the aqueous solution in the range from 6 to 8;

(c) adding, to the aqueous solution, ammonium carbonate or ammonium hydrogen carbonate in a particulate form;

(d) agitating the aqueous solution containing particles of ammonium carbonate or ammonium hydrogen carbonate while maintaining the pH of the solution in the range from 6 to 9 to cause dissolution of the, ammonium carbonate or ammonium hydrogen carbonate in the aqueous medium and precipitation of a composite carbonate of lanthanum, manganese and, optionally, strontium therein;

(e) collecting the precipitates of the composite carbonate; and (f) drying and calcining the precipitates of the composite carbonate.

The lanthanum manganite powder obtained by the above defined method of the invention characteristically has good flowability as expressed in terms of the angle of repose which does not exceed 45°.

DETAILED DESCRIPTION OF THE PREFERRED EMBODIMENTS

As is described above, the inventive method comprises several essential steps of (a) to (f) while the most characteristic is the step (c) in which an aqueous solution of water-soluble compounds or salts of lanthanide, manganese and, optionally, strontium is admixed with ammonium carbonate or ammonium hydrogen carbonate, referred to as ammonium carbonate for simplicity, in the form of a solid or, namely, in the form of particles or granules instead of an aqueous solution conventionally used in the precipitation of a composite carbonate of lanthanum, manganese and, optionally, strontium in the prior art. Although the mechanism that the composite carbonate precipitates formed by this method produce a highly flowable lanthanum manganite powder by calcination is not well understood, it is presumable that the reaction of precipitation proceeds locally only at or in the vicinity of the ammonium carbonate particles under conditions quite different from those in the bulk of an aqueous solution so that the microstructure of the precipitates of the composite carbonate is also quite different from that of the precipitates formed by mixing aqueous solutions. Advantageously, the precipitates of the thus formed composite carbonate consist of aggregates of microcrystals to exhibit good filtrability in the recovery of the precipitates from the aqueous medium by filtration. Further, the lanthanum manganite powder obtained by calcination of the precipitates of the composite carbonate consists of a single perovskite phase to exhibit good flowability expressed in terms of the angle of repose.

The starting aqueous solution prepared in step (a) of the inventive method, to which ammonium carbonate is added in a particulate form, is prepared by dissolving water-soluble compounds or salts of the respective elements of lanthanum, manganese and, optionally, strontium in water. Instead of using water-soluble salts of the elements, it is more advantageous that compounds of the respective elements which are not soluble in neutral water but soluble in an acidic aqueous medium, are dissolved in an inorganic acid capable of forming water-soluble salts by reacting with those compounds. Such water-insoluble but acid-soluble compounds of the elements include oxides, hydroxides and carbonates though not particularly limitative thereto. The inorganic acid used to dissolve these oxides, hydroxides or carbonates is preferably nitric acid in an amount at least equivalent to the compounds to be dissolved therein or slightly in excess. The concentration of the thus prepared aqueous solution should be in the range from 0.01 to 3.0 moles/liter or, preferably, from 0.5 to 1.0 mole/liter as a total of the lanthanum, manganese and, when used, strontium calculated as metals. The proportion of the amounts of these three compounds is selected in compliance with the chemical composition of the lanthanum manganite product according to the composition formula given above.

In step (b) of the inventive method, the pH of the thus prepared aqueous solution is adjusted to 6 to 8. When the aqueous solution is prepared by dissolving oxides, hydroxides or carbonates of the respective elements in an acid, the aqueous solution as prepared is usually acidic due to the excess amount of the acid so that the pH of the solution must be adjusted by the addition of a small volume of diluted ammonia water. When the aqueous solution is prepared by dissolving neutral salts of the respective elements in water, the solution as prepared may have a pH of 6 to 8 so that no further adjustment of the pH is required as a matter of course.

The thus prepared aqueous solution of the water-soluble compounds of lanthanum, manganese and, optionally, strontium is then admixed, in step (c), with ammonium carbonate in the form of solid at a temperature in the range from −10° to +60° C. or, conveniently, at room temperature under agitation. The ammonium carbonate should be in the form of particles having an average particle diameter of at least 1 μm or, preferably, from 10 to 100 μm. When the particle size of the ammonium carbonate particles is too small, no uniform aggregates of microcrystals can be obtained so as to badly affect the filtrability of the composite carbonate precipitates along with a decrease in the flowability of the lanthanum manganite powder prepared therefrom. The particle configuration of the ammonium carbonate particles is preferably spherical or cubic while flaky, platelet-formed or acicular particle configuration is less preferable.

The amount of the ammonium carbonate particles added to the aqueous solution is in the range from 1.5 to 3.0 times or, preferably, from 1.9 to 2.1 times of the stoichiometric amount assuming the reactions to form lanthanum carbonate $La_2(CO_3)_3$, manganese carbonate $MnCO_3$ and, when a strontium compound is used, strontium carbonate $SrCO_3$. When the amount of the ammonium carbonate particles is too small or too large, the precipitation of the manganese value would be insufficient to decrease the yield of the precipitates along with a possible shift in the chemical composition of the resultant lanthanum manganite powder.

The whole amount of the ammonium carbonate particles can be added at one time to the aqueous solution although portion-wise addition of the ammonium carbonate is preferable.

In step (d) of the inventive method, the aqueous solution thus admixed with the ammonium carbonate particles is agitated, for example, at room temperature so that the carbonation reaction of the lanthanum, manganese and strontium compounds takes place at or in the vicinity of the surface of the ammonium carbonate particles to form precipitates of a composite carbonate of these elements. It is important that the pH of the aqueous medium is kept in the range from 6 to 9 or, preferably, from 6.5 to 8, if necessary, by the addition of an ammonia water during the precipitating reaction of the composite carbonate. When the pH of the aqueous medium during formation of the precipitates is too low, the reaction of precipitates formation would not proceed to completeness along with an adverse influence of coarsening of the single particles of the precipitates while, when the pH is too high, the precipitates of the composite carbonate would have poor filtrability to cause a difficulty in the recovery thereof from the aqueous medium by filtration.

The thus obtained precipitates of the composite carbonate consist of relatively uniform aggregated microcrystals so that they can easily be separated from the aqueous medium without difficulties. The composite carbonate particles are then dried and calcined to be converted into a composite oxide of a lanthanum manganite powder of the desired chemical composition having a perovskite-type crystalline structure of the particles. The temperature of calcination should be 700° C. or higher and the calcination is usually complete within 30 minutes. The lanthanum manganite powder obtained in accordance with the inventive method has excellent flowability as estimated in terms of the angle of repose which does not exceed 45° in the inventive powders. This angle of repose is critical since, when the angle exceeds 45°, a great decrease is caused in the flowability of the powder sometimes resulting in the phenomenon of bridging in a feeder hopper when the powder is used as a starting material in a manufacturing process of various products.

In the following, the method of the present invention is described in more detail by way of examples.

EXAMPLE 1.

Lanthanum oxide, strontium carbonate and manganese carbonate in amounts of 2.82 g, 2.55 g and 5.00 g, respectively, were dissolved in 16.3 ml of concentrated nitric acid and the solution was diluted with deionized water to make up a volume of 700 ml followed by the adjustment of the pH of the solution to 7.2 by the addition of a small volume of diluted ammonia water. Thereafter, the solution was admixed, under agitation, with 18.24 g of an ammonium carbonate powder having an average particle diameter of 40 μm at room temperature so as to precipitate a composite carbonate of lanthanum, manganese and strontium by continuing agitation of the reaction mixture for 30 minutes, during which the pH of the reaction mixture was monitored and confirmed to be in the range from 7.2 to 7.8. The precipitates were collected by filtration, washed with water, dried and then subjected to calcination in air at 900° C. for 20 hours to convert the carbonate into oxide. The thus obtained strontium-substituted lanthanum manganite had a chemical composition of the formula $(La_{0.5}Sr_{0.5})_1MnO_{2.75}$ containing no detectable amount of unreacted lanthanum oxide and consisted of a single perovskite phase. The angle of repose of this composite oxide powder was 38.5°.

EXAMPLE 2.

Lanthanum oxide, strontium carbonate and manganese carbonate in amounts of 3.60 g, 0.81 g and 5.00 g, respectively, were dissolved in 15.5 ml of concentrated nitric acid and the solution was diluted with deionized water to make up a volume of 700 ml followed by the adjustment of the pH of the solution to 6.5 by the addition of a small volume of diluted ammonia water. Thereafter, the solution was admixed, under agitation, with 14.28 g of an ammonium hydrogen carbonate powder having an average particle diameter of 50 μm at room temperature with concurrent addition of an ammonia water to keep the pH of the reaction mixture in the range from 6.5 to 7.5 so that precipitates of a composite carbonate of lanthanum, manganese and strontium were obtained. Agitation of the reaction mixture was continued for 30 minutes. The precipitates were collected by filtration, washed with water, dried and then subjected to calcination in air at 900° C. for 20 hours to convert the carbonate into oxide. The thus obtained strontium-substituted lanthanum manganite had a chemical composition of the formula $(La_{0.8}Sr_{0.2})_{0.8}MnO_{2.62}$ containing no detectable amount of unreacted lanthanum oxide and consisted of a single perovskite phase. The angle of repose of this composite oxide powder was 39.5°.

EXAMPLE 3.

Lanthanum oxide and manganese carbonate in amounts of 5.62 g and 5.00 g, respectively, were dissolved in 17.7 ml of concentrated nitric acid and the solution was diluted with deionized water to make up a volume of 700 ml followed by the adjustment of the pH of the solution to 7.1 by the addition of a small volume of diluted ammonia water. Thereafter, the solution was admixed, under agitation, with 19.87 g of an ammonium carbonate powder having an average particle diameter of 40 μm at room temperature so as to precipitate a composite carbonate of lanthanum and manganese by continuing agitation of the reaction mixture for 30 minutes, during which the pH of the reaction mixture was monitored and confirmed to be in the range from 7.1 to 8.0. The precipitates were collected by filtration, washed with water, dried and then subjected to calcination in air at 900° C. for 20 hours to convert the carbonate into oxide. The thus obtained lanthanum manganite had a chemical composition of the formula $LaMnO_3$ containing no detectable amount of unreacted lanthanum oxide and consisted of a single perovskite phase. The angle of repose of this composite oxide powder was 37.6°.

COMPARATIVE EXAMPLE 1.

Lanthanum oxide, strontium carbonate and manganese carbonate in amounts of 6.22 g, 0.62 g and 4.87 g, respectively, corresponding to a chemical formula of $(La_{0.9}Sr_{0.1})_1MnO_{2.95}$ after calcination were taken and thoroughly blended together with 12 ml of water to form a mull of the powders which was dried and subjected to calcination in air at 1200° C. for 10 hours to convert the carbonates into oxides. The thus obtained strontium-substituted lanthanum manganite contained a detectable amount of unreacted lanthanum oxide by the X-ray powder diffractometric analysis.

The angle of repose of this composite oxide powder was 55.3°.

COMPARATIVE EXAMPLE 2.

Lanthanum oxide, strontium carbonate and manganese carbonate in amounts of 3.60 g, 0.81 g and 5.00 g, respectively, corresponding to a chemical formula of $(La_{0.8}Sr_{0.2})_{0.8}MnO_{2.62}$ after calcination were taken and thoroughly blended together with 12 ml of water to form a mull of the powders which was dried and subjected to calcination in air at 1200° C. for 10 hours to convert the carbonates into oxides. The thus obtained strontium-substituted lanthanum manganite contained a detectable amount of unreacted lanthanum oxide by the X-ray powder diffractometric analysis. The angle of repose of this composite oxide powder could not be determined due to the extremely poor flowability behavior of the powder.

What is claimed is:

1. A method for the preparation of a powder of lanthanum manganite substituted or unsubstituted by strontium having a composition formula of $(La_{1-x}Sr_x)_yMnO_z$, in which x is 0 or a positive number not exceeding 0.5, y is a positive number in the range from 0.8 to 1 and z is a positive number in the range from 2.5 to 3.0, which comprises the steps of:

(a) preparing an aqueous solution of water soluble compounds of lanthanum, manganese and strontium by dissolving the compounds in water or by dissolving compounds of lanthanum, manganese and strontium in an inorganic acid;

(b) adjusting the pH of the aqueous solution in the range from 6 to 8;

(c) adding, to the aqueous solution, ammonium carbonate or ammonium hydrogen carbonate in a particulate form;

(d) agitating the aqueous solution containing particles of ammonium carbonate or ammonium hydrogen carbonate while maintaining the pH of the solution in the range from 6 to 9 to cause dissolution of the ammonium carbonate or ammonium hydrogen carbonate in the aqueous medium and precipitation of a composite carbonate of lanthanum, manganese and strontium therein;

(e) collecting the precipitates of the composite carbonate; and (f) drying and calcining the precipitates of the composite carbonate.

2. The method for the preparation of a powder of lanthanum manganite substituted or unsubstituted by strontium as claimed in claim 1 in which the amount of ammonium carbonate or ammonium hydrogen carbonate in a particulate form is in the range from 1.5 to 3.0 moles per hole of the total amount of the compounds of lanthanum, manganese and strontium.

3. The method for the preparation of a powder of lanthanum manganite substituted or unsubstituted by strontium as claimed in claim 1 in which the aqueous solution prepared in step (a) contains the compounds of lanthanum, manganese and strontium in a concentration in the range from 0.5 to 1.0 mole/liter as a total of lanthanum, manganese and strontium calculated as metals.

\* \* \* \* \*